United States Patent
Chen

(10) Patent No.: US 10,168,739 B1
(45) Date of Patent: Jan. 1, 2019

(54) ELECTRONIC DEVICE WITH MULTIPLE DISPLAY MODULES

(71) Applicant: ACER INCORPORATED, New Taipei (TW)

(72) Inventor: Liang-Chun Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 15/939,294

(22) Filed: Mar. 29, 2018

(30) Foreign Application Priority Data

Dec. 26, 2017 (TW) .............................. 106145648 A

(51) Int. Cl.
*G06F 1/16* (2006.01)
*H05K 5/00* (2006.01)
*H05K 7/00* (2006.01)

(52) U.S. Cl.
CPC .......... *G06F 1/1649* (2013.01); *G06F 1/1616* (2013.01); *G06F 1/1683* (2013.01)

(58) Field of Classification Search
CPC .... G06F 1/1649; G06F 1/1616; G06F 1/1683; G06F 1/1618; G06F 1/162; G06F 1/1647
USPC ............ 361/679.04, 679.06, 679.07, 679.21, 361/679.26, 679.27, 679.55
See application file for complete search history.

(56) References Cited

U.S. PATENT DOCUMENTS

| | | | | |
|---|---|---|---|---|
| 7,283,353 B1* | 10/2007 | Jordan | .................. | G06F 1/1601 248/122.1 |
| 2003/0218577 A1* | 11/2003 | Wang | .................... | G06F 1/1616 345/1.3 |
| 2006/0082518 A1* | 4/2006 | Ram | ..................... | G06F 1/1601 345/1.1 |
| 2006/0268500 A1* | 11/2006 | Kuhn | .................... | G06F 1/1616 361/679.04 |
| 2007/0247792 A1* | 10/2007 | Yang | ..................... | G06F 1/1616 361/679.27 |
| 2007/0247798 A1* | 10/2007 | Scott, II | ................ | G06F 1/1616 361/679.04 |
| 2008/0062625 A1* | 3/2008 | Batio | .................... | G06F 1/1615 361/679.29 |
| 2011/0002096 A1* | 1/2011 | Thorson | ................ | G06F 1/1618 361/679.04 |
| 2011/0043990 A1* | 2/2011 | Mickey | .................. | F16M 11/06 361/679.04 |

(Continued)

FOREIGN PATENT DOCUMENTS

CN 201251721 Y 6/2009
TW 543812 7/2003

*Primary Examiner* — Anthony Haughton
(74) *Attorney, Agent, or Firm* — Winston Hsu

(57) ABSTRACT

An electronic device includes three screen modules and a host. The first screen module includes a first screen and a first frame. The second screen module includes a second screen and a second frame. The third screen module includes a third screen and a third frame. Using pivot structures, the first frame is pivotally connected to the second frame on its left side, pivotally connected to the third frame on its right side, and pivotally connected to the host on its bottom side. The pivot structures also allow the first screen to rotate around the central axis of the first frame, allow the second screen to rotate around the central axis of the second frame, and allow the third screen to rotate around the central axis of the third frame.

8 Claims, 12 Drawing Sheets

(56) References Cited

U.S. PATENT DOCUMENTS

| | | | |
|---|---|---|---|
| 2011/0228463 A1* | 9/2011 | Matagne | G06F 1/1649 |
| | | | 361/679.04 |
| 2014/0340830 A1* | 11/2014 | Wu | G06F 1/162 |
| | | | 361/679.27 |
| 2016/0070302 A1* | 3/2016 | Matzke | G06F 1/1649 |
| | | | 361/679.04 |
| 2016/0124466 A1* | 5/2016 | Ram | G06F 1/1601 |
| | | | 361/679.26 |

* cited by examiner

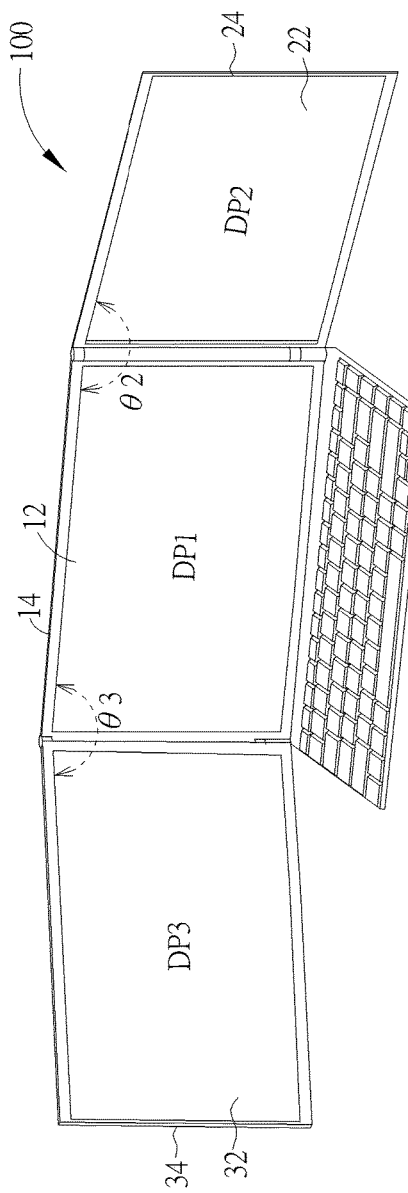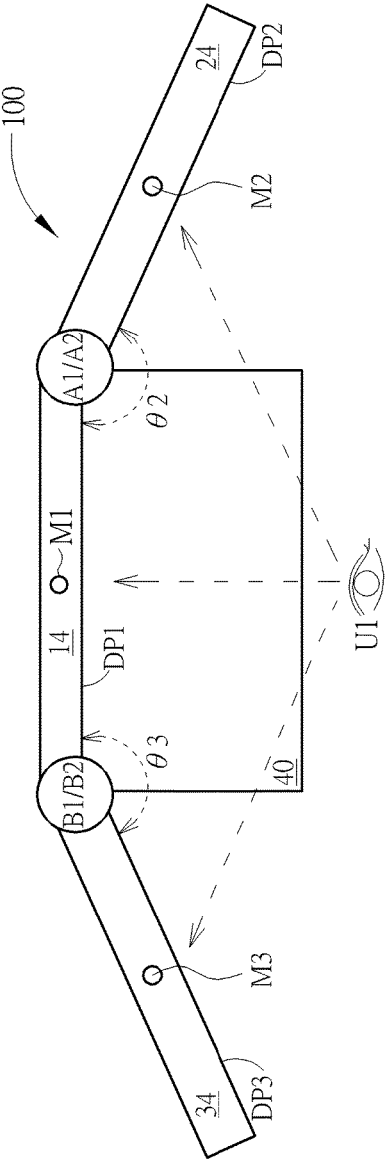
FIG. 7A
FIG. 7B

US 10,168,739 B1

ELECTRONIC DEVICE WITH MULTIPLE DISPLAY MODULES

CROSS REFERENCE TO RELATED APPLICATION

This application claims priority of Taiwan Application No. 106145648 filed on 2017 Dec. 26.

BACKGROUND OF THE INVENTION

1. Field of the Invention

The present invention is related to an electronic device with multiple screen modules, and more particularly, to an electronic device with multiple screen modules capable of adjusting angles.

2. Description of the Prior Art

In an era of information abundance driven by increasingly advanced technology, a single window or a single screen is sometimes not enough for certain workflows or tasks. When using a prior art flat panel display to open multiple windows simultaneously, the user is required to constantly switch between these overlapped windows, which causes inconvenience and disrupts the process of a single task. In order to display all the windows on the same screen without overlapping each other, the size of these windows need to be reduced, which may result in failure to present the contents clearly due to lower resolution. Therefore, there is a need for an electronic device with multiple screens.

SUMMARY OF THE INVENTION

The present invention provides an electronic device with multiple screen modules which includes a first screen module, a second screen module, a third screen module and a host. The first screen module includes a first screen and a first frame configured to contain the first screen. The first frame includes a first side, a second side, a third side and a fourth side, wherein the first side of the first frame is opposite to the second side of the first frame and the third side of the first frame is opposite to the fourth side of the first frame; a first pivot structure disposed on the first side and the second side of the first frame on a first central axis so as to allow the first screen to rotate around the first central axis; a second pivot structure disposed on the third side of the first frame; a third pivot structure disposed on the fourth side of the first frame; and a fourth pivot structure disposed on the second side of the first frame. The second screen module includes a second screen and a second frame configured to contain the second screen. The second frame includes a first side, a second side, a third side and a fourth side, wherein the first side of the second frame is opposite to the second side of the second frame and the third side of the second frame is opposite to the fourth side of the second frame; a fifth pivot structure disposed on the first side and the second side of the second frame on a second central axis so as to allow the second screen to rotate around the second central axis; and a sixth pivot structure disposed on the third side of the second frame and pivotally connected to the second pivot structure of the first frame. The third screen module includes a third screen and a third frame configured to contain the third screen. The third frame includes a first side, a second side, a third side and a fourth side, wherein the first side of the third frame is opposite to the second side of the third frame and the third side of the third frame is opposite to the fourth side of the third frame; a seventh pivot structure disposed on the first side and the second side of the third frame on a third central axis so as to allow the third screen to rotate around the third central axis; and an eighth pivot structure disposed on the third side of the third frame and pivotally connected to the third pivot structure of the first frame. The host includes a ninth pivot structure pivotally connected to the fourth pivot structure of the first frame.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 7A and 7B are diagrams illustrating the screen action of the electronic device in a triple-screen application according to an embodiment of the present invention.

DETAILED DESCRIPTION

Figure 1:
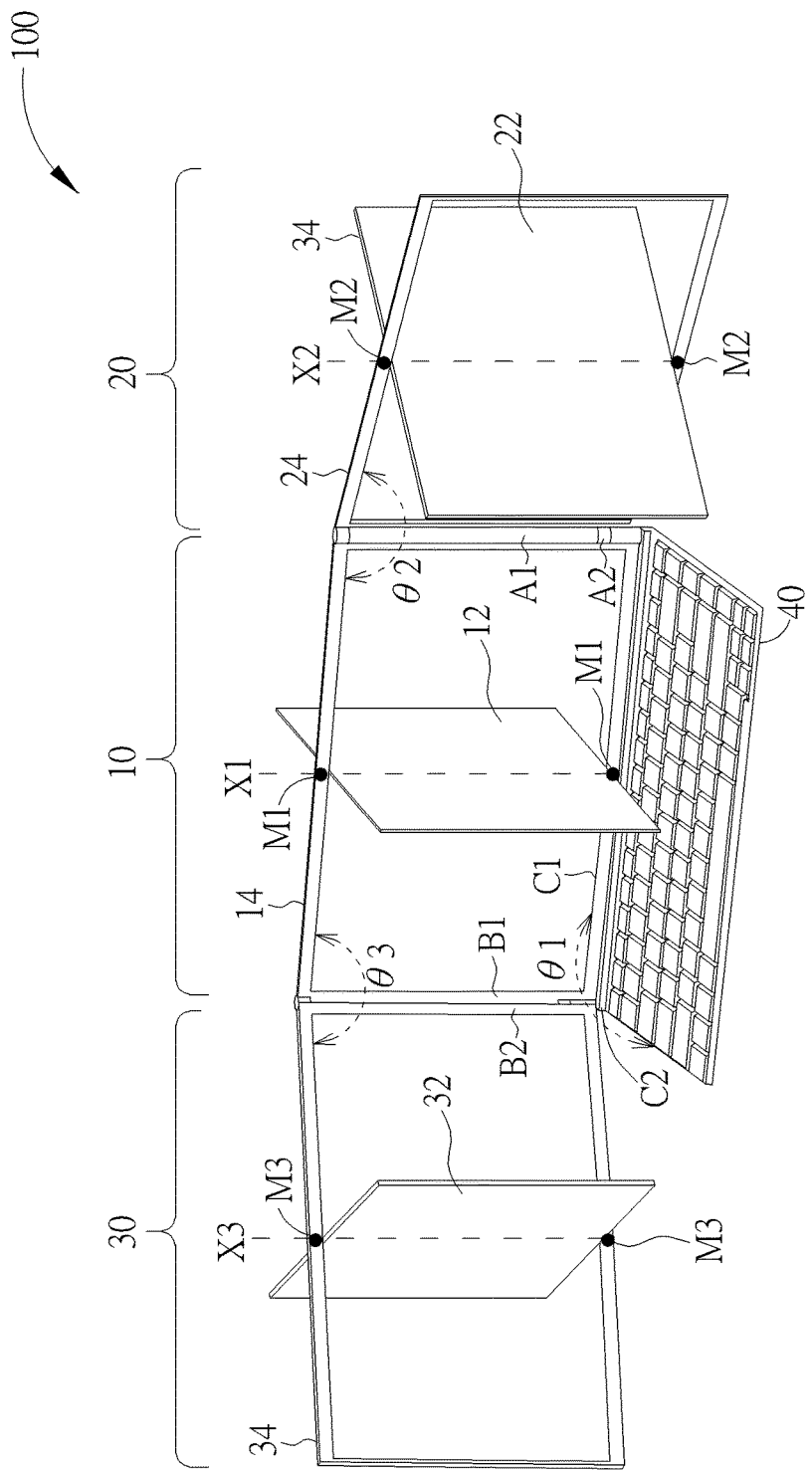
FIG. 1 is a diagram illustrating an electronic device with multiple screen modules according to an embodiment of the present invention.

FIG. 1 is a diagram illustrating an electronic device 100 with multiple screen modules according to an embodiment of the present invention. The electronic device 100 includes a first screen module 10, a second screen module 20, a third screen module 30, and a host 40. The first screen module 10 includes a first screen 12 and a first frame 14. The second screen module 20 includes a second screen 22 and a second frame 24. The third screen module 30 includes a third screen 32 and a third frame 34. The first frame 14 is used to contain the first screen 12, the second frame 24 is used to contain the second screen 22, and the third frame 34 is used to contain the third screen 32.

The first frame 14 includes a pivot structure A1 on its right side, a pivot structure B1 on its left side, a pivot structure C1 on its bottom side, and a pivot structure M1 disposed on its top side and its bottom side on a central axis X1. The second frame 24 includes a pivot structure A2 on its left side, and a pivot structure M2 disposed on its top side and its bottom side on a central axis X2. The third frame 34 includes a pivot structure B2 on its right side, and a pivot structure M3 disposed on its top side and its bottom side on a central axis X3. The host 40 includes a pivot structure C2 on one side.

Using the pivot structures A1-A2, B1-B2, C1-C2, and M1-M3, the user may adjust the relative position and angle between adjacent screens, as well as adjust the relative position and angle between the first screen 12 and the host 40 for various applications. First, the mechanical actions related to each frame are illustrated. The first frame 14 may be pivotally connected to the pivot structure A2 of the second frame 24 via the pivot structure A1, pivotally connected to the pivot structure B2 of the third frame 34 via the pivot structure B1, and pivotally connected to the pivot structure C2 of the host 40 via the pivot structure C1. θ1 represents the angle between the front side of the first frame 14 and the front side of the host 40. θ2 represents the angle between the front side of the first frame 14 and the front side of the second frame 24. θ3 represents the angle between the front side of the first frame 14 and the front side of the third frame 34.

Next, the mechanical action related to each frame and its corresponding screen is illustrated. The pivot structure M1 provides a pivot point which allows the first screen 12 to rotate around the central axis X1 of the first frame 14. The pivot structure M2 provides a pivot point which allows the second screen 22 to rotate around the central axis X2 of the second frame 24. The pivot structure M3 provides a pivot point which allows the third screen 32 to rotate around the central axis X3 of the third frame 34.

FIGS. 2A-4A and 2B-4B are diagrams illustrating the screen actions of the electronic device 100 in a single-screen application according to embodiments of the present invention. FIGS. 2A-4A are diagrams illustrating the exterior view of the electronic device 100 in a single-screen application, and FIGS. 2B-4B are diagrams illustrating the top view of the electronic device 100 along the arrow S in a single-screen application. The display side of the first screen 12 is designated as DP1, while the back side of the first screen 12 is unmarked. The display side of the second screen 22 is designated as DP2, while the back side of the second screen 22 is unmarked. The display side of the third screen 32 is designated as DP3, while the back side of the third screen 32 is unmarked. The size of each component in the electronic device 100 is only for illustrative purpose, but does not limit the scope of the present invention.

Figures 2A, 2B:
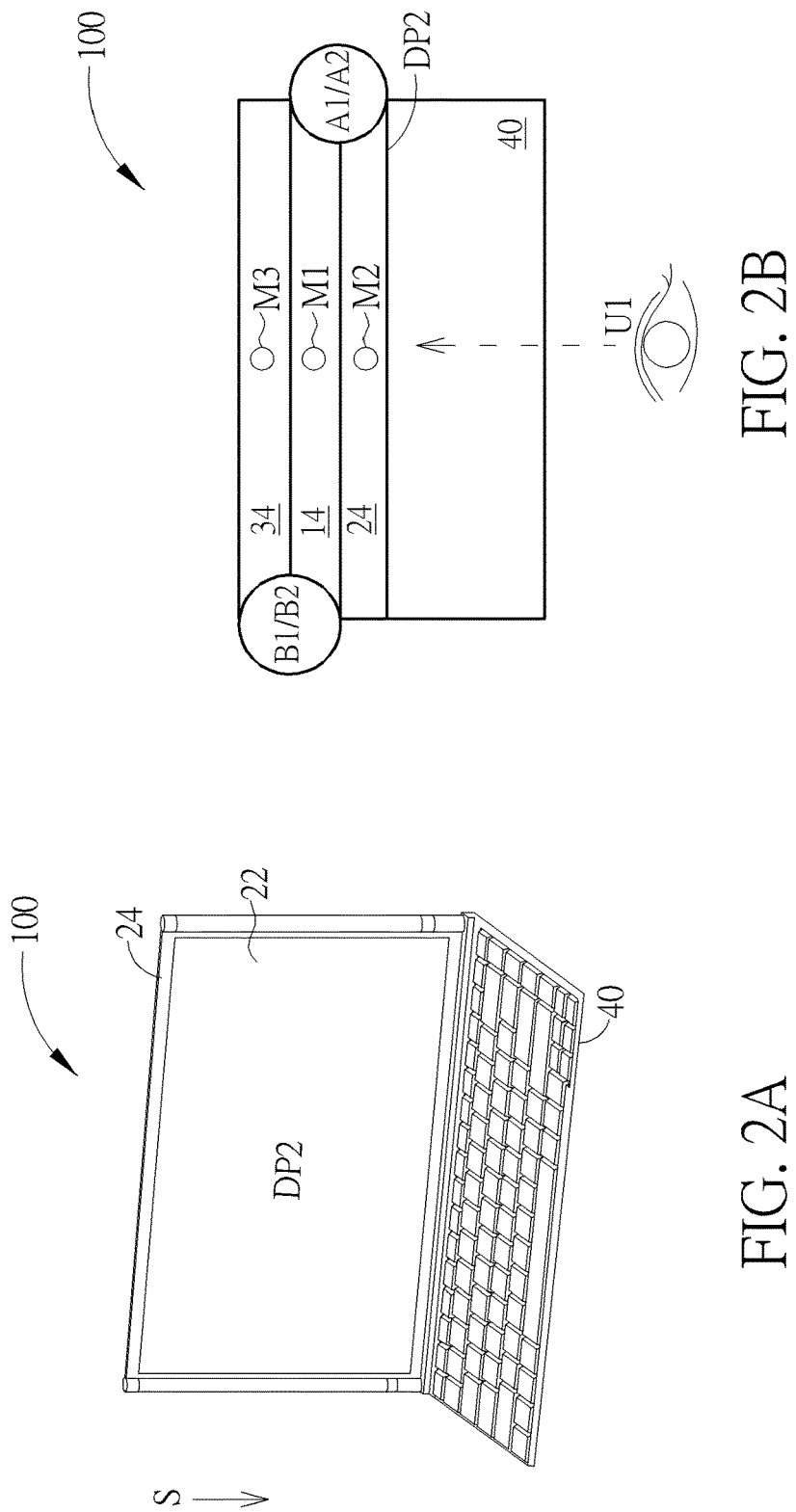
FIGS. 2A and 2B are diagrams illustrating the screen action of the electronic device in a single-screen application according to an embodiment of the present invention.

In the embodiment illustrated in FIGS. 2A and 2B, the user of the electronic device 100 may rotate the second frame 24 towards the front side of the first frame 14 for closing them (θ2=0 degree), rotate the third frame 34 towards the back side of the first frame 14 for closing them (θ3=360 degree), and position the display side DP2 of the second screen 22 to face a user U1 (the back side of the second screen 22 facing the first screen 12) using the pivot structure M2. Under such circumstance, the electronic device 100 functions as a single-screen device, wherein the second screen 22 contained in the second frame 24 is the main screen, while the first screen 12 contained in the first frame 14 and the third screen 32 contained in the third frame 34 are not in use.

Figure 3B:
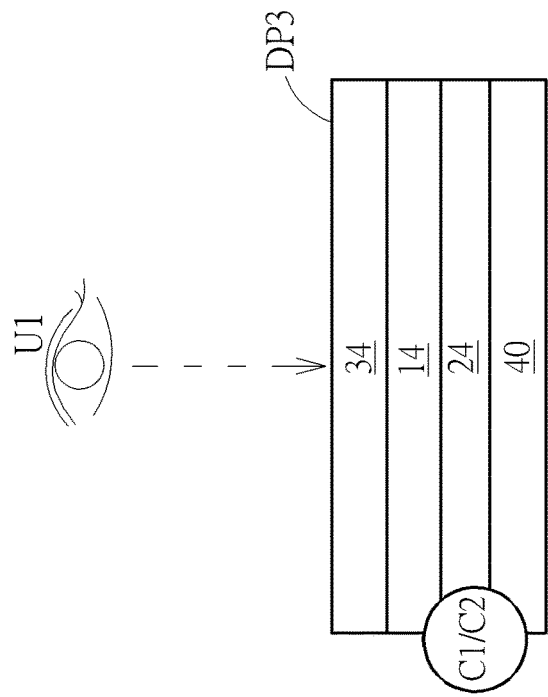
FIGS. 3A and 3B are diagrams illustrating the screen action of the electronic device in a single-screen application according to another embodiment of the present invention.
Figure 3A:
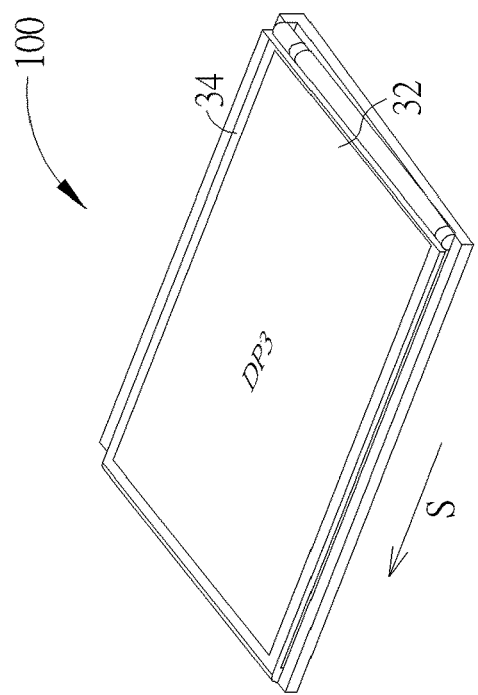

In the embodiment illustrated in FIGS. 3A and 3B, the user of the electronic device 100 may rotate the second frame 24 towards the front side of the first frame 14 for closing them (θ2=0 degree), rotate the third frame 34 towards the back side of the first frame 14 for closing them (θ3=360 degree), close the first frame 14 and the host 40 using the pivot structures C1 and C2 (θ1=0 degree), and position the display side DP3 of the third screen 32 to face a user U1 (the back side of the third screen 32 facing the first screen 12) using the pivot structure M3. Under such circumstance, the electronic device 100 functions as a tablet device, wherein the third screen 32 contained in the third frame 34 is the main screen, while the first screen 12 contained in the first frame 14 and the second screen 22 contained in the second frame 24 are not in use.

Figure 4A:
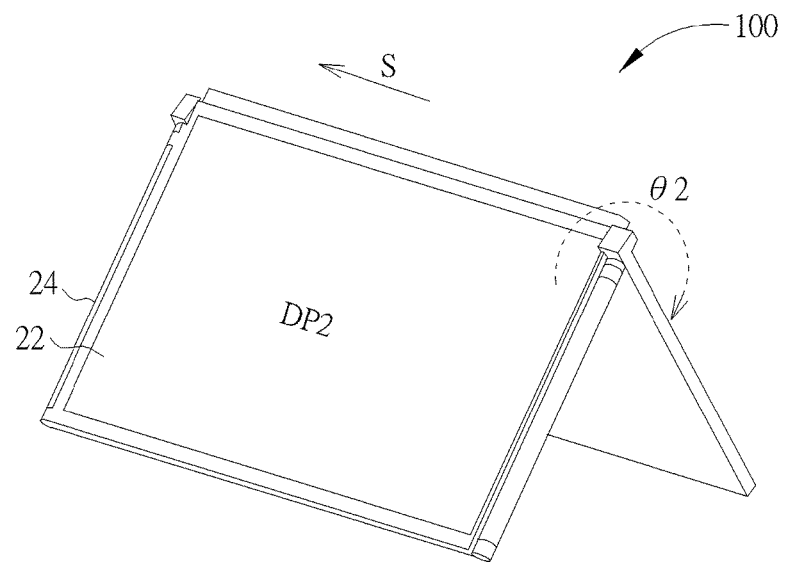
FIGS. 4A and 4B are diagrams illustrating the screen action of the electronic device in a single-screen application according to another embodiment of the present invention.
Figure 4B:
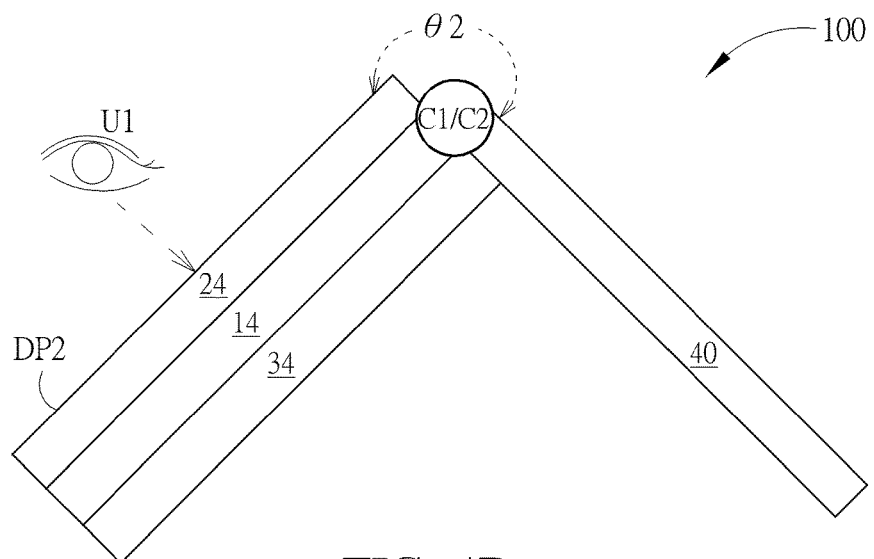

In the embodiment illustrated in FIGS. 4A and 4B, the user of the electronic device 100 may rotate the second frame 24 towards the front side of the first frame 14 for closing them (θ2=0 degree), rotate the third frame 34 towards the back side of the first frame 14 for closing them (θ3=360 degree), position the first frame 14 at an angle (θ1>180 degree) to the host 40 using the pivot structures C1 and C2, and position the display side DP2 of the second screen 22 to face a user U1 (the back side of the second screen 22 facing the first screen 12) using the pivot structure M2. Under such circumstance, the electronic device 100 functions as a tablet device with a stand, wherein the second screen 22 contained in the second frame 24 is the main screen, while the first screen 12 contained in the first frame 14 and the third screen 32 contained in the third frame 34 are not in use.

FIGS. 5A-6A and 5B-6B are diagrams illustrating the screen actions of the electronic device 100 in a dual-screen application according to embodiments of the present invention. FIGS. 5A-6A are diagrams illustrating the exterior view of the electronic device 100 in a dual-screen application, and FIGS. 5B-6B are diagrams illustrating the top view of the electronic device 100 along the arrow S in a dual-screen application. The display side of the first screen 12 is designated as DP1, while the back side of the first screen 12 is unmarked. The display side of the second screen 22 is designated as DP21, while the back side of the second screen 22 is unmarked. The display side of the third screen 32 is designated as DP3, while the back side of the third screen 32 is unmarked. The size of each component in the electronic device 100 is only for illustrative purpose, but does not limit the scope of the present invention.

Figure 5A:
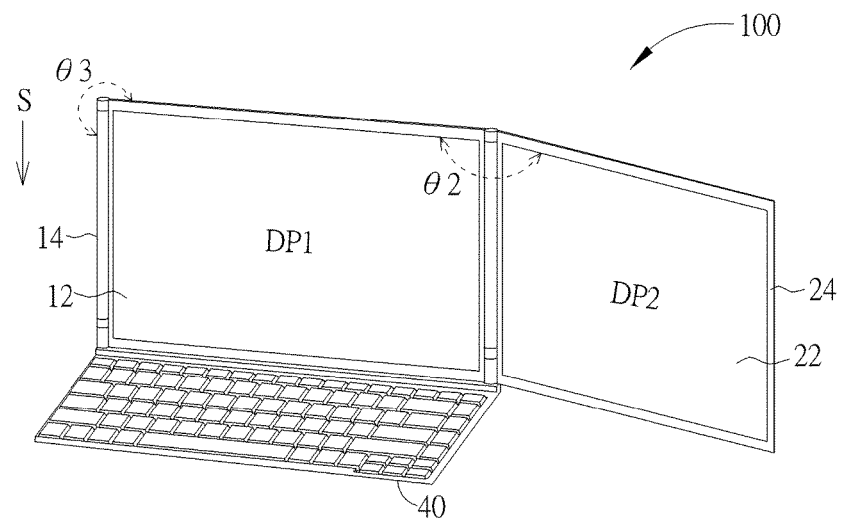
FIGS. 5A and 5B are diagrams illustrating the screen action of the electronic device in a dual-screen application according to an embodiment of the present invention.
Figure 5B:
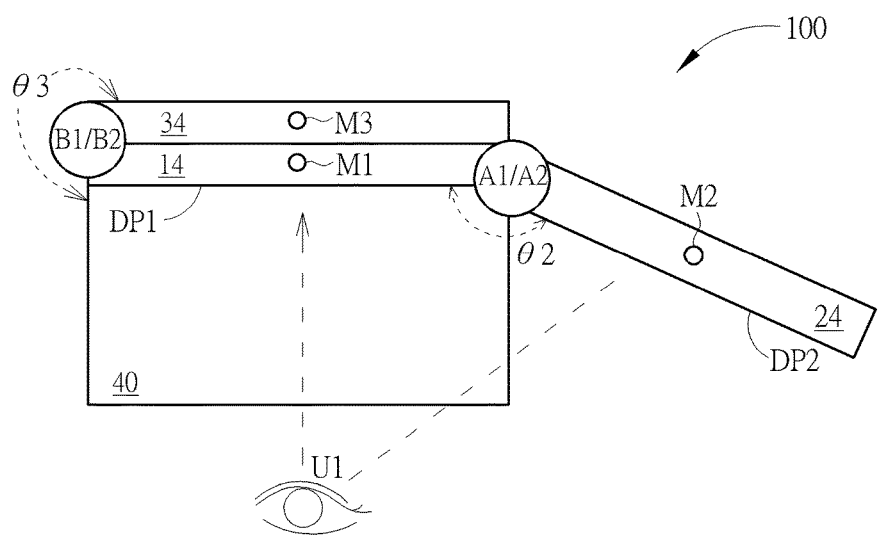

In the embodiment illustrated in FIGS. 5A and 5B, the user of the electronic device 100 may open the second frame 24 (θ2>0 degree), rotate the third frame 34 towards the back side of the first frame 14 for closing them (θ3=360 degree), position the display side DP1 of the first screen 21 to face a user U1 using the pivot structure M1, and position the display side DP2 of the second screen 22 to face the user U1 using the pivot structure M2. Under such circumstance, the electronic device 100 may provide two screens for a single user U1, wherein the first screen 12 contained in the first frame 14 is the main screen and the second screen 22 contained in the second frame 24 is the secondary screen, while and the third screen 32 contained in the third frame 34 is not in use.

Figure 6A:
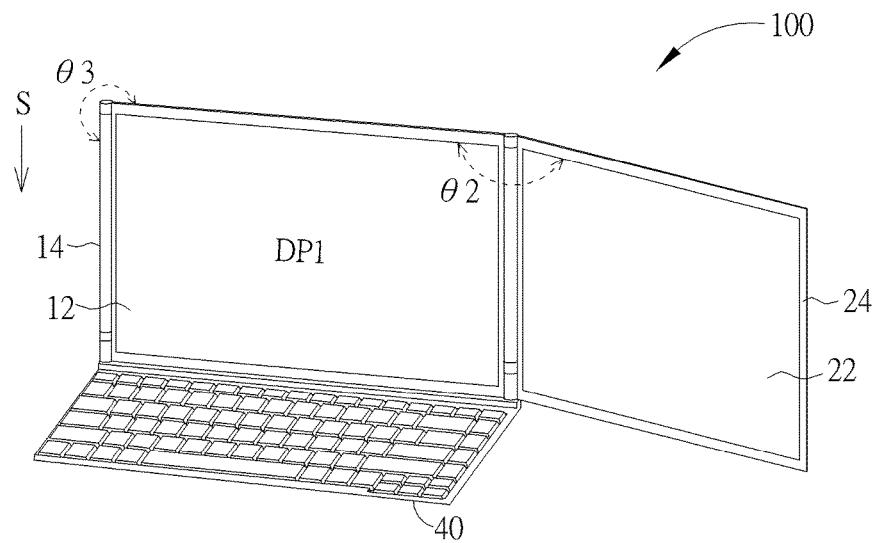
FIGS. 6A and 6B are diagrams illustrating the screen action of the electronic device in a dual-screen application according to another embodiment of the present invention.
Figure 6B:
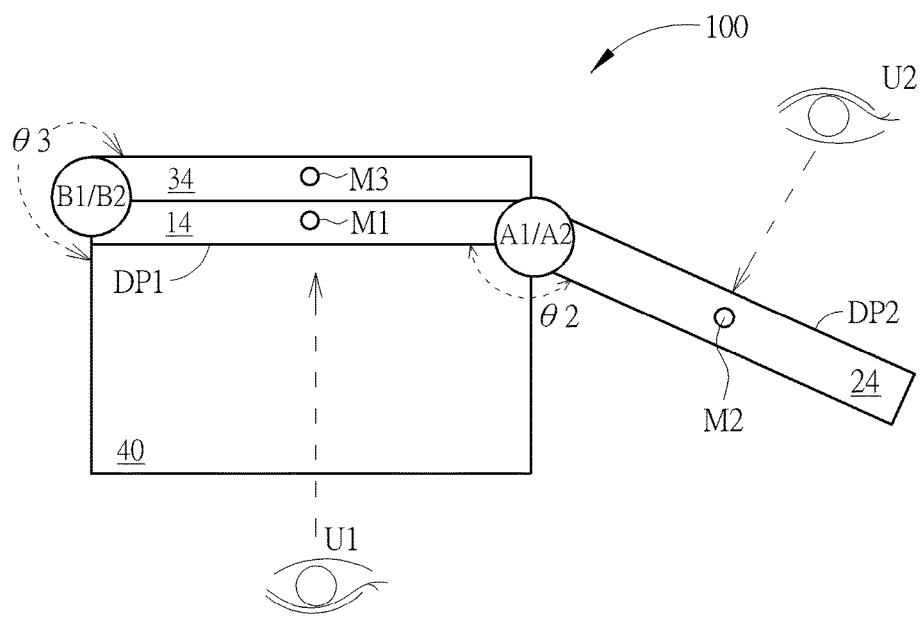

In the embodiment illustrated in FIGS. 6A and 6B, the user of the electronic device 100 may open the second frame 24 (θ2>0 degree), rotate the third frame 34 towards the back side of the first frame 14 for closing them (θ3=360 degree), position the display side DP1 of the first screen 21 to face a user U1 using the pivot structure M1, and position the display side DP2 of the second screen 22 to face a user U2 using the pivot structure M2. Under such circumstance, the electronic device 100 may provide two screens respectively for two users U1 and U2, wherein the first screen 12 contained in the first frame 14 is the main screen of the user U1 and the second screen 22 contained in the second frame 24 is the main screen of the user U2, while and the third screen 32 contained in the third frame 34 is not in use.

FIGS. 7A-10A and 7B-10B are diagrams illustrating the screen actions of the electronic device 100 in a triple-screen application according to embodiments of the present invention. FIGS. 7A-10A are diagrams illustrating the exterior view of the electronic device 100 in a triple-screen application, and FIGS. 7B-10B are diagrams illustrating the top view of the electronic device 100 along the arrow S in a triple-screen application. The display side of the first screen 12 is designated as DP1, while the back side of the first screen 12 is unmarked. The display side of the second screen 22 is designated as DP21, while the back side of the second screen 22 is unmarked. The display side of the third screen 32 is designated as DP3, while the back side of the third screen 32 is unmarked. The size of each component in the electronic device 100 is only for illustrative purpose, but does not limit the scope of the present invention.

In the embodiment illustrated in FIGS. 7A and 7B, the user of the electronic device 100 may open the second frame 24 (θ2>0 degree), open the third frame 34 (θ3>0 degree), position the display side DP1 of the first screen 21 to face a user U1 using the pivot structure M1, position the display side DP2 of the second screen 22 to face the user U1 using the pivot structure M2, and position the display side DP3 of the third screen 32 to face the user U1 using the pivot structure M3. Under such circumstance, the electronic device 100 may provide three screens for a single user U1.

Figure 8A:
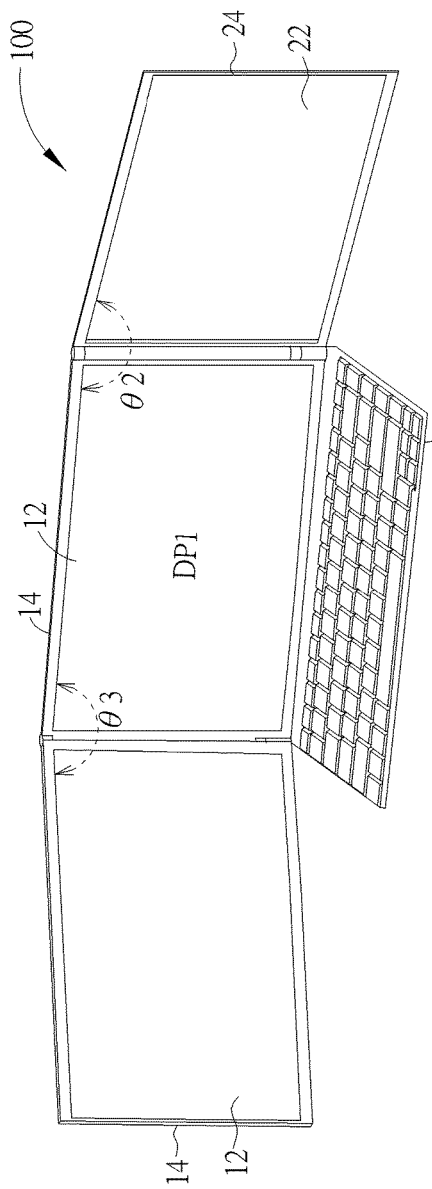
FIGS. 8A and 8B are diagrams illustrating the screen action of the electronic device in a triple-screen application according to another embodiment of the present invention.
Figure 8B:
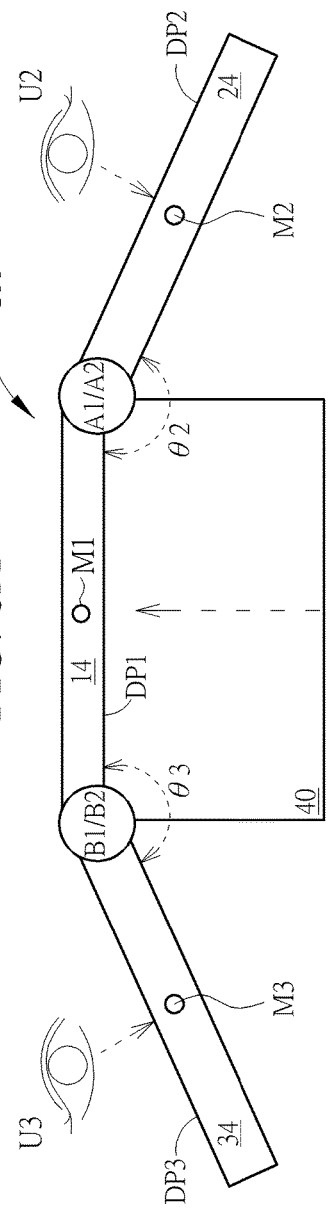

In the embodiment illustrated in FIGS. 8A and 8B, the user of the electronic device 100 may open the second frame 24 (θ2>0 degree), open the third frame 34 (θ3>0 degree), position the display side DP1 of the first screen 21 to face a user U1 using the pivot structure M1, position the display side DP2 of the second screen 22 to face a user U2 using the pivot structure M2, and position the display side DP3 of the third screen 32 to face a user U3 using the pivot structure M3. Under such circumstance, the electronic device 100 may provide three screens respectively for three users U1, U2 and U3.

Figure 9A:
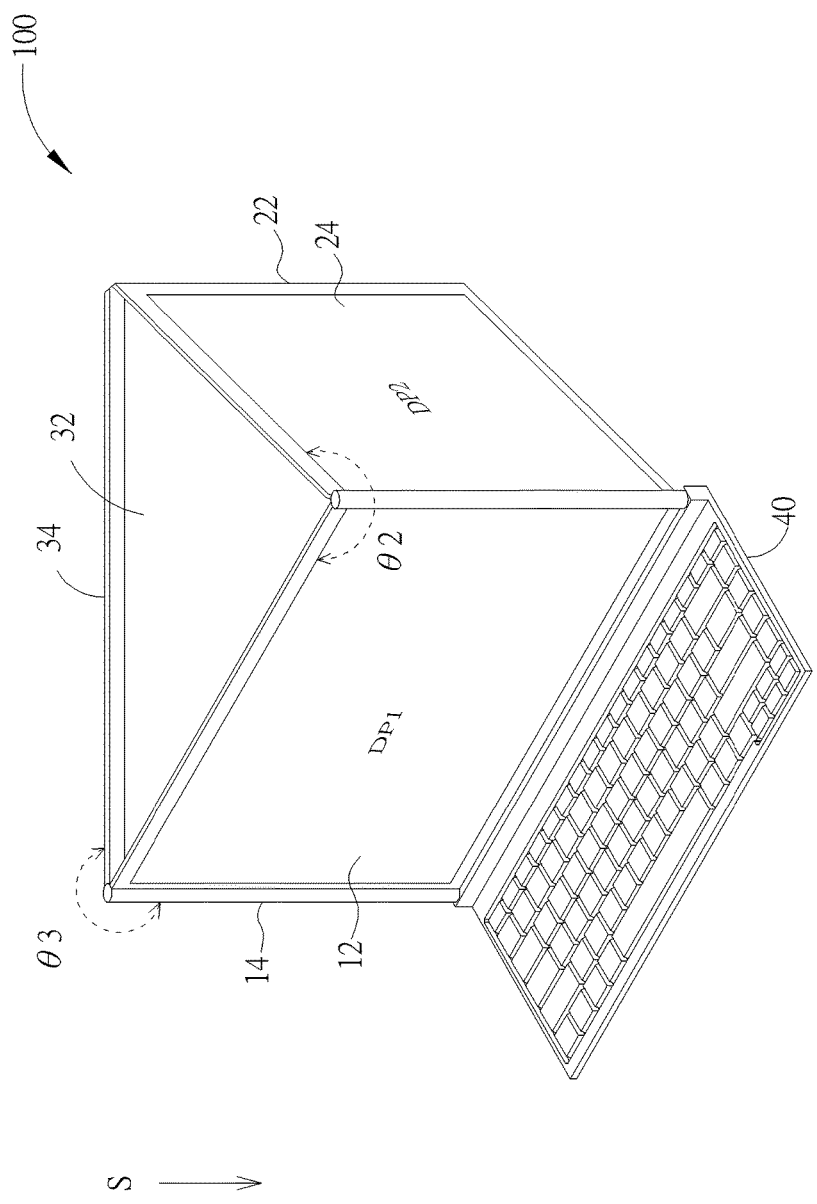
FIGS. 9A and 9B are diagrams illustrating the screen action of the electronic device in a triple-screen application according to another embodiment of the present invention.
Figure 9B:
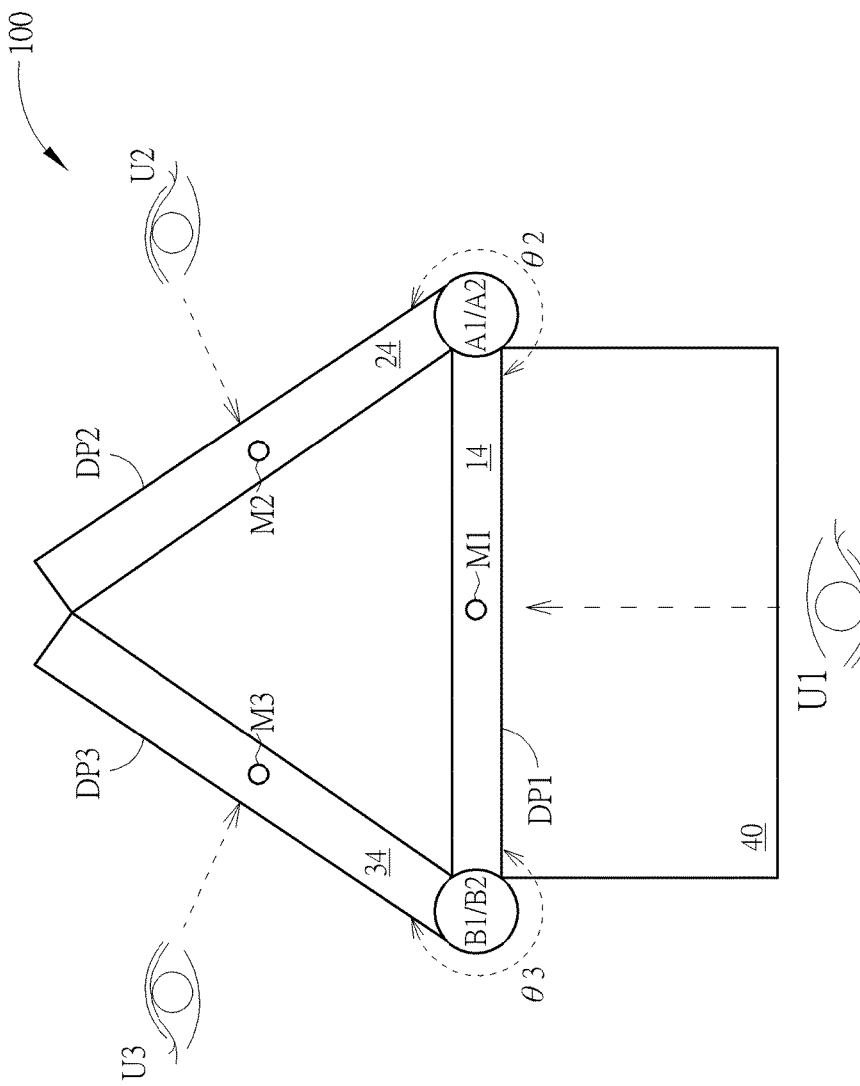

In the embodiment illustrated in FIGS. 9A and 9B, the user of the electronic device 100 may rotate the second frame 24 and the third frame 34 towards the back side of the first frame 14 so that the second frame 24 and the third frame 34 are in contact with each other (θ2=θ3=300 degree), position the display side DP1 of the first screen 21 to face a user U1 using the pivot structure M1, position the display side DP2 of the second screen 22 to face a user U2 using the pivot structure M2, and position the display side DP3 of the third screen 32 to face a user U3 using the pivot structure M3. Under such circumstance, the electronic device 100 may provide three screens respectively for three users U1, U2 and U3.

Figure 10A:
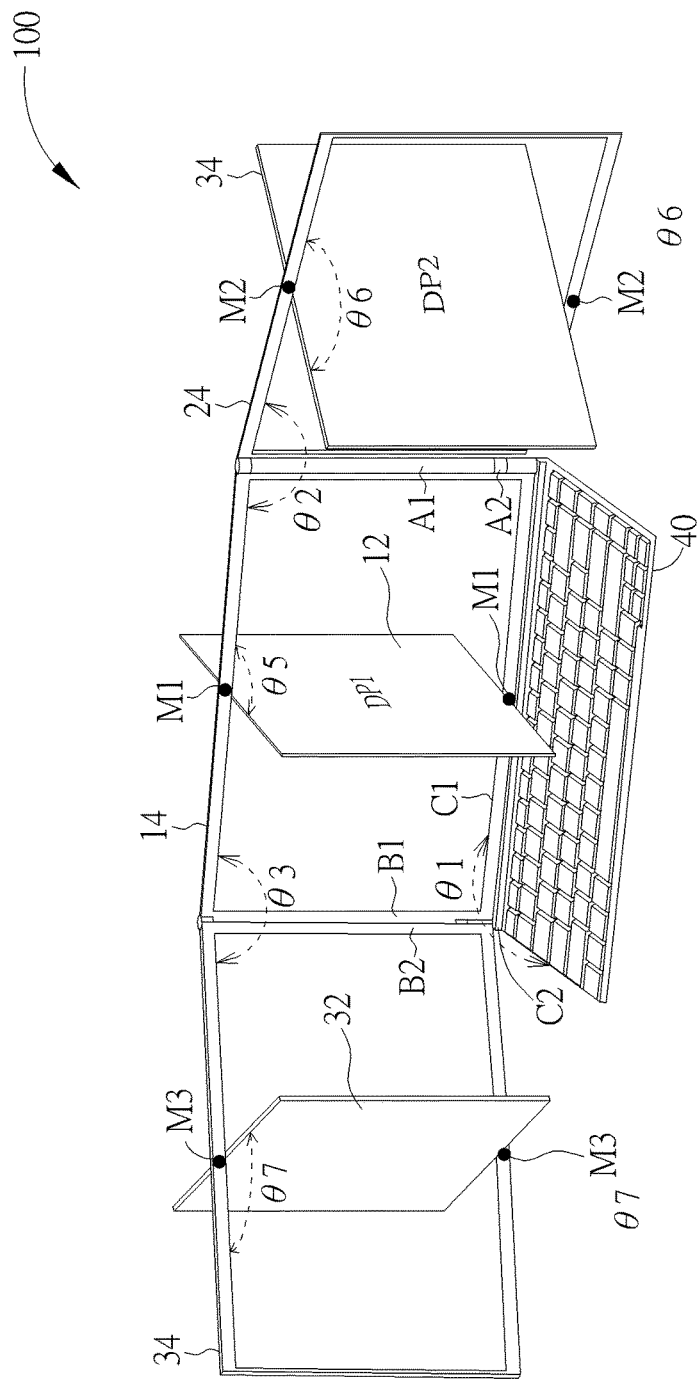
FIGS. 10A and 10B are diagrams illustrating the screen action of the electronic device in a triple-screen application according to another embodiment of the present invention.
Figure 10B:
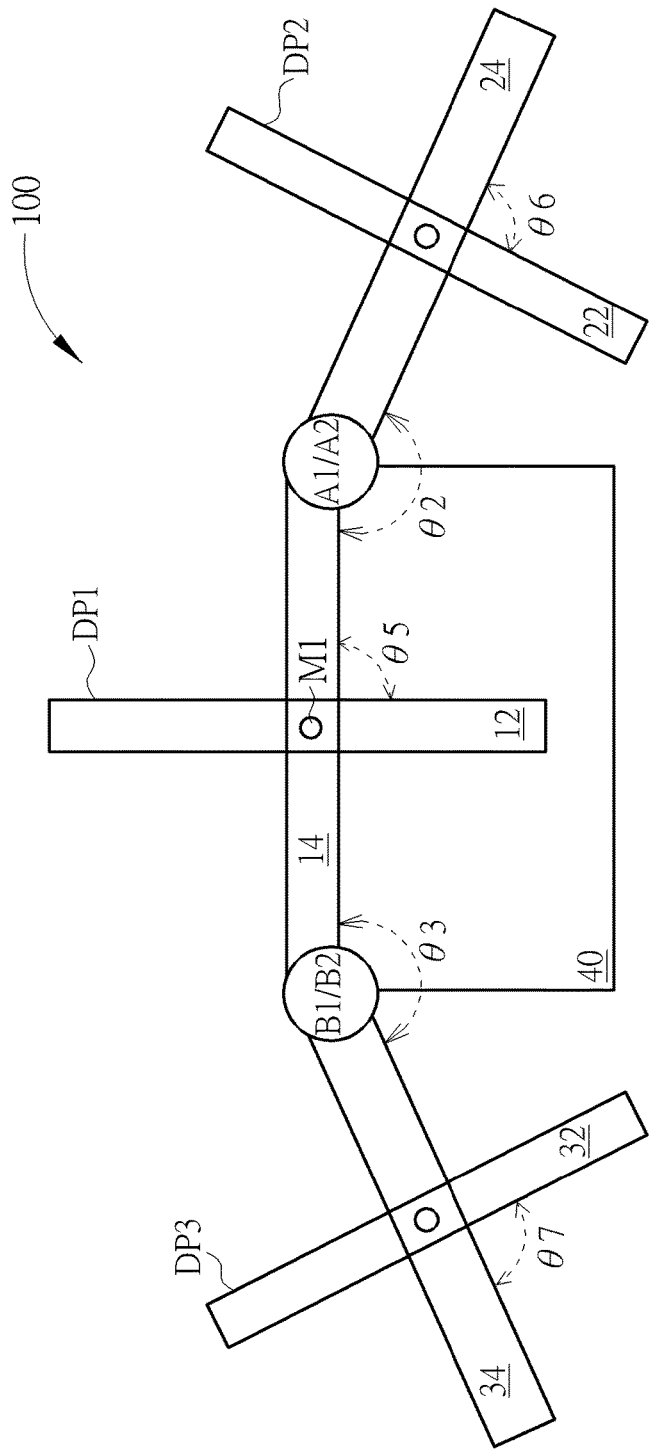

In the embodiment illustrated in FIGS. 10A and 10B, the user of the electronic device 100 may open the second frame 24 (θ2>0 degree), open the third frame 34 (θ3>0 degree), position the display side DP1 of the first screen 21 to be at an angle θ5 with respect to the first frame 14 using the pivot structure M1 in order to face a first specific direction, position the display side DP2 of the second screen 22 to be at an angle θ6 with respect to the second frame 24 using the pivot structure M2 in order to face a second specific direction, and position the display side DP3 of the third screen 32 to be at an angle θ7 with respect to the third frame 34 using the pivot structure M3 in order to face a third specific direction position. Under such circumstance, the electronic device 100 may provide three screens for multiple users near the electronic device 100.

In the embodiment of the present invention, the pivot structure M1 may include two shafts respectively disposed on the top side and the bottom side of the first frame 14 on the first central axis X1, the pivot structure M2 may include two shafts respectively disposed on the top side and the bottom side of the second frame 24 on the second central axis X2, and the pivot structure M3 may include two shafts respectively disposed on the top side and the bottom side of the third frame 34 on the third central axis X3.

In the embodiment of the present invention, the signal line of the first screen 12 may be electrically connected to the host 40 via the pivot structure M1 and the first frame 14 by means of internal cable routing, the signal line of the second screen 22 may be electrically connected to the host 40 via the pivot structure M2 and the second frame 24 by means of internal cable routing, and the signal line of the third screen 32 may be electrically connected to the host 40 via the pivot structure M3 and the third frame 34 by means of internal cable routing. Therefore, the present invention does not require external cable routing which occupies extra space.

In conclusion, the present invention provides an electronic device with multiple screen modules. Each of the first through third screen modules includes a screen and a frame for containing the screen. Using multiple adjustable pivot structures, the first frame is pivotally connected to the second frame on its left side, pivotally connected to the third frame on its right side, and pivotally connected to the host on its bottom side. The pivot structures also allow the first screen to rotate around the central axis of the first frame, allow the second screen to rotate around the central axis of the second frame, and allow the third screen to rotate around the central axis of the third frame. Therefore, the present electronic device with multiple screen modules allows the user to adjust the position and direction of each screen flexibly for various applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An electronic device with multiple screen modules, comprising:
 a first screen module, comprising:
  a first screen; and
  a first frame configured to contain the first screen and comprising:
   a first side, a second side, a third side and a fourth side, wherein the first side of the first frame is opposite to the second side of the first frame and the third side of the first frame is opposite to the fourth side of the first frame;
   a first pivot structure disposed on the first side and the second side of the first frame on a first central axis so as to allow the first screen to rotate around the first central axis;
   a second pivot structure disposed on the third side of the first frame;
   a third pivot structure disposed on the fourth side of the first frame; and
   a fourth pivot structure disposed on the second side of the first frame;
 a second screen module, comprising:
  a second screen; and
  a second frame configured to contain the second screen and comprising:

a first side, a second side, a third side and a fourth side, wherein the first side of the second frame is opposite to the second side of the second frame and the third side of the second frame is opposite to the fourth side of the second frame;

a fifth pivot structure disposed on the first side and the second side of the second frame on a second central axis so as to allow the second screen to rotate around the second central axis; and a sixth pivot structure disposed on the third side of the second frame and pivotally connected to the second pivot structure of the first frame;

a third screen module, comprising:

a third screen; and a third frame configured to contain the third screen and comprising:

a first side, a second side, a third side and a fourth side, wherein the first side of the third frame is opposite to the second side of the third frame and the third side of the third frame is opposite to the fourth side of the third frame;

a seventh pivot structure disposed on the first side and the second side of the third frame on a third central axis so as to allow the third screen to rotate around the third central axis; and an eighth pivot structure disposed on the third side of the third frame and pivotally connected to the third pivot structure of the first frame; and a host comprising a ninth pivot structure pivotally connected to the fourth pivot structure of the first frame.

2. The electronic device of claim 1, wherein:

a first signal line of the first screen module is electrically connected to the host via the first pivot structure and the first frame;

a second signal line of the second screen module is electrically connected to the host via the fifth pivot structure and the second frame; and a third signal line of the third screen module is electrically connected to the host via the seventh pivot structure and the third frame.

3. The electronic device of claim 1, wherein:

the first pivot structure comprises:

a first shaft disposed on the first side of the first frame on the first central axis; and a second shaft disposed on the second side of the first frame on the first central axis;

the fifth pivot structure comprises:

a third shaft disposed on the first side of the second frame on the second central axis; and a fourth shaft disposed on the second side of the second frame on the second central axis; and the seventh pivot structure comprises:

a fifth shaft disposed on the first side of the third frame on the third central axis; and a sixth shaft disposed on the second side of the third frame on the third central axis.

4. The electronic device of claim 1, wherein:

the second pivot structure of the first frame and the sixth pivot structure of the second frame allow a front side of the first frame to be at a first angle with respect to a front side of the second frame;

the third pivot structure of the first frame and the eighth pivot structure of the third frame allow the front side of the first frame to be at a second angle with respect to a front side of the third frame; and the fourth pivot structure of the first frame and the ninth pivot structure of the host allow the front side of the first frame to be at a third angle with respect to a front side of the host.

5. The electronic device of claim 4, wherein the first angle is 0 degree, the second angle is 360 degree, the third angle is larger than 0 degree, and a back side of the second screen faces the first screen in a single-screen application.

6. The electronic device of claim 4, wherein the first angle is 0 degree, the second angle is 360 degree, the third angle is 0 degree, and a back side of the third screen faces the first screen in a single-screen application.

7. The electronic device of claim 4, wherein the first angle is larger than 0 degree, the second angle is 360 degree, the third angle is larger than 0 degree, a display side of the first screen faces a first user, and a display side of the second screen faces the first user or a second user in a multi-screen application.

8. The electronic device of claim 4, wherein the first angle is larger than 0 degree, the second angle is larger than 0 degree, the third angle is larger than 0 degree, a display side of the first screen faces a first user, a display side of the second screen faces the first user or a second user, and a display side of the third screen faces the first user or a third user in a multi-screen application.

* * * * *